(12) United States Patent  
Powell

(10) Patent No.: US 9,376,501 B2  
(45) Date of Patent: Jun. 28, 2016

(54) METHODS FOR DIGESTION OF CELLULOSIC BIOMASS SOLIDS IN THE PRESENCE OF A PHENOLIC SOLVENT GENERATED IN SITU FROM LIGNIN

(71) Applicant: SHELL OIL COMPANY, Houston, TX (US)

(72) Inventor: Joseph Broun Powell, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 14/207,786

(22) Filed: Mar. 13, 2014

(65) Prior Publication Data

US 2014/0275513 A1 Sep. 18, 2014

Related U.S. Application Data

(60) Provisional application No. 61/783,985, filed on Mar. 14, 2013.

(51) Int. Cl.

| | |
|---|---|
| *C12P 7/10* | (2006.01) |
| *D21C 3/20* | (2006.01) |
| *D21C 7/14* | (2006.01) |
| *C08B 1/00* | (2006.01) |
| *C10G 1/06* | (2006.01) |
| *C10G 1/08* | (2006.01) |
| *C10G 3/00* | (2006.01) |

(Continued)

(52) U.S. Cl.  
CPC . *C08B 1/003* (2013.01); *D21C 3/20* (2013.01); *D21C 3/222* (2013.01); *D21C 7/14* (2013.01); *D21C 11/0007* (2013.01); *Y02E 50/16* (2013.01); *Y02P 30/20* (2015.11)

(58) Field of Classification Search  
None  
See application file for complete search history.

(56) References Cited

U.S. PATENT DOCUMENTS

| 4,420,644 A | 12/1983 | Huibers et al. |
| 6,030,915 A | 2/2000 | De Boer |
| 6,127,229 A | 10/2000 | Chu et al. |

(Continued)

FOREIGN PATENT DOCUMENTS

| WO | 2011138356 | 11/2011 |
| WO | WO 2011138356 A1 * | 11/2011 |

(Continued)

OTHER PUBLICATIONS

Written Opinion of International Application PCT/US2014/0253805 filed Mar. 13, 2014.

*Primary Examiner* — Peter A Salamon

(57) ABSTRACT

Digestion of cellulosic biomass solids can be enhanced in the presence of a phenolic solvent. Methods for digesting cellulosic biomass solids can comprise providing cellulosic biomass solids in a digestion medium comprising water and an organic solvent; heating the cellulosic biomass solids and the digestion medium in a digestion unit in the presence of molecular hydrogen and a slurry catalyst capable of activating molecular hydrogen, thereby forming an alcoholic component and liberating lignin, the lignin forming a phenolics liquid phase partitioned from the digestion medium and at least a portion of the slurry catalyst accumulating in the phenolics liquid phase; removing at least a portion of the phenolics liquid phase and accumulated slurry catalyst from the digestion unit; converting at least a portion of the phenolics liquid phase into a phenolic solvent; and returning at least a portion of the phenolic solvent and the slurry catalyst to the digestion unit.

18 Claims, 1 Drawing Sheet

(51) Int. Cl.
  *D21C 3/22*   (2006.01)
  *D21C 11/00*  (2006.01)

(56) References Cited

U.S. PATENT DOCUMENTS

| | | |
|---|---|---|
| 2010/0236988 A1 | 9/2010 | Gabrielov et al. |
| 2012/0152836 A1* | 6/2012 | Powell et al. ............... 210/620 |
| 2012/0167876 A1* | 7/2012 | Qiao et al. ...................... 127/37 |
| 2012/0317872 A1 | 12/2012 | Powell et al. |
| 2013/0109896 A1* | 5/2013 | Powell et al. ............... 585/240 |
| 2013/0152457 A1 | 6/2013 | Powell et al. |
| 2013/0152458 A1 | 6/2013 | Powell et al. |
| 2013/0225719 A1 | 8/2013 | Kuroe et al. |
| 2014/0005444 A1 | 1/2014 | Komplin et al. |
| 2014/0005445 A1 | 1/2014 | Komplin et al. |
| 2014/0275513 A1* | 9/2014 | Powell ............................ 536/56 |

FOREIGN PATENT DOCUMENTS

| | | |
|---|---|---|
| WO | 2014070580 | 5/2014 |
| WO | 2014070582 | 5/2014 |
| WO | 2014070583 | 5/2014 |
| WO | 2014070584 | 5/2014 |
| WO | 2014070587 | 5/2014 |
| WO | 2014070588 | 5/2014 |

\* cited by examiner

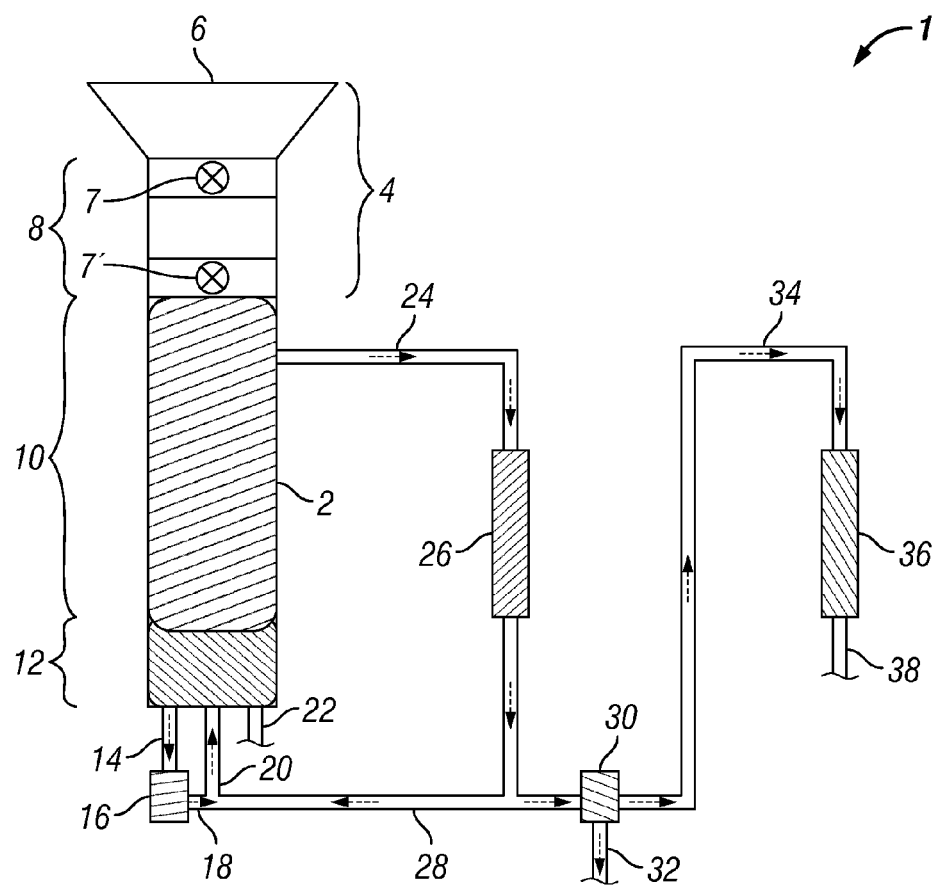

METHODS FOR DIGESTION OF CELLULOSIC BIOMASS SOLIDS IN THE PRESENCE OF A PHENOLIC SOLVENT GENERATED IN SITU FROM LIGNIN

The present non-provisional application claims the benefit of U.S. Provisional Patent Application No. 61/783,985 filed Mar. 14, 2013, the entire disclosure of which is hereby incorporated by reference.

TECHNICAL FIELD

The present disclosure generally relates to digestion of cellulosic biomass solids, and, more specifically, to methods for digesting cellulosic biomass solids in the presence of a phenolic solvent.

BACKGROUND

A number of substances of commercial significance may be produced from natural sources, including biomass. Cellulosic biomass may be particularly advantageous in this regard due to the versatility of the abundant carbohydrates found therein in various forms. As used herein, the term "cellulosic biomass" refers to a living or recently living biological material that contains cellulose. The lignocellulosic material found in the cell walls of higher plants is the world's largest source of carbohydrates. Materials commonly produced from cellulosic biomass may include, for example, paper and pulpwood via partial digestion, and bioethanol by fermentation.

Plant cell walls are divided into two sections: primary cell walls and secondary cell walls. The primary cell wall provides structural support for expanding cells and contains three major polysaccharides (cellulose, pectin, and hemicellulose) and one group of glycoproteins. The secondary cell wall, which is produced after the cell has finished growing, also contains polysaccharides and is strengthened through polymeric lignin that is covalently crosslinked to hemicellulose. Hemicellulose and pectin are typically found in abundance, but cellulose is the predominant polysaccharide and the most abundant source of carbohydrates. The complex mixture of constituents that is co-present with the cellulose can make its processing difficult, as discussed hereinafter. Lignin, in particular, may be an especially difficult constituent to deal with due to its non-cellulosic structure and its significant abundance in cellulosic biomass.

Significant attention has been placed on developing fossil fuel alternatives derived from renewable resources. Cellulosic biomass has garnered particular attention in this regard due to its abundance and the versatility of the various constituents found therein, particularly cellulose and other carbohydrates. Despite promise and intense interest, the development and implementation of bio-based fuel technology has been slow. Existing technologies have heretofore produced fuels having a low energy density (e.g., bioethanol) and/or that are not fully compatible with existing engine designs and transportation infrastructure (e.g., methanol, biodiesel, Fischer-Tropsch diesel, hydrogen, and methane). Moreover, conventional bio-based processes have produced intermediates in dilute aqueous solutions (>50% water by weight) that are difficult to further process into fuel blends. Energy- and cost-efficient processes for converting cellulosic biomass into fuel blends having similar compositions to fossil fuels would be highly desirable to address the foregoing issues and others.

When converting cellulosic biomass into fuel blends and other materials, cellulose and other complex carbohydrates therein can be extracted and transformed into simpler organic molecules, which can be further reformed thereafter. Fermentation is one process whereby complex carbohydrates from cellulosic biomass may be converted into a more usable form. However, fermentation processes are typically slow, require large volume reactors and high dilution conditions, and produce an initial reaction product having a low energy density (ethanol). Digestion is another way in which cellulose and other complex carbohydrates may be converted into a more usable form. Digestion processes can break down cellulose and other complex carbohydrates within cellulosic biomass into simpler, soluble carbohydrates that are suitable for further transformation through downstream reforming reactions. As used herein, the term "soluble carbohydrates" refers to monosaccharides or polysaccharides that become solubilized in a digestion process. Although the underlying chemistry is understood behind digesting cellulose and other complex carbohydrates and further transforming simple carbohydrates into organic compounds reminiscent of those present in fossil fuels, high-yield and energy-efficient digestion processes suitable for converting cellulosic biomass into fuel blends have yet to be developed. In this regard, the most basic requirement associated with converting cellulosic biomass into fuel blends using digestion and other processes is that the energy input needed to bring about the conversion should not be greater than the available energy output of the product fuel blends. This basic requirement leads to a number of secondary issues that collectively present an immense engineering challenge that has not been solved heretofore.

The issues associated with converting cellulosic biomass into fuel blends in an energy- and cost-efficient manner using digestion are not only complex, but they are entirely different than those that are encountered in the digestion processes commonly used in the paper and pulpwood industry. Since the intent of cellulosic biomass digestion in the paper and pulpwood industry is to retain a solid material (e.g., wood pulp), incomplete digestion is usually performed at low temperatures (e.g., less than about 100° C.) for a fairly short period of time. In contrast, digestion processes suitable for converting cellulosic biomass into fuel blends and other materials are ideally configured to maximize yields by solubilizing as much of the original cellulosic biomass charge as possible in a high-throughput manner. Paper and pulpwood digestion processes also typically remove lignin from the raw cellulosic biomass as a waste product during pulp formation. Although digestion processes used in connection with forming fuel blends and other materials may likewise remove lignin prior to digestion, these extra process steps may impact the energy efficiency and cost of the biomass conversion process. However, digesting cellulosic biomass solids to produce soluble carbohydrates in the presence of significant quantities of lignin may present significant process issues in its own right.

Production of soluble carbohydrates for use in fuel blends and other materials via routine modification of paper and pulpwood digestion processes is not believed to be economically feasible for a number of reasons. Simply running the digestion processes of the paper and pulpwood industry for a longer period of time to produce more soluble carbohydrates is undesirable from a throughput standpoint. Use of digestion promoters such as strong alkalis, strong acids, or sulfites to accelerate the digestion rate can increase process costs and complexity due to post-processing separation steps and the possible need to protect downstream components from these agents. Accelerating the digestion rate by increasing the digestion temperature can actually reduce yields due to thermal degradation of soluble carbohydrates that can occur at elevated digestion temperatures, particularly over extended periods of time. Once produced by digestion, soluble carbohydrates are very reactive and can rapidly degrade to produce caramelans and other heavy ends degradation products, especially under higher temperature conditions, such as above about 150° C. Use of higher digestion temperatures can also be undesirable from an energy efficiency standpoint. Any of these difficulties can defeat the economic viability of fuel blends derived from cellulosic biomass.

One way in which soluble carbohydrates can be protected from thermal degradation is through subjecting them to one or more catalytic reduction reactions, which may include hydrogenation and/or hydrogenolysis reactions. Stabilizing soluble carbohydrates through conducting one or more catalytic reduction reactions may allow digestion of cellulosic biomass to take place at higher temperatures than would otherwise be possible without unduly sacrificing yields. Depending on the reaction conditions and catalyst used, reaction products formed as a result of conducting one or more catalytic reduction reactions on soluble carbohydrates may comprise one or more alcohol functional groups, particularly including triols, diols, monohydric alcohols, and any combination thereof, some of which may also include a residual carbonyl functionality (e.g., an aldehyde or a ketone). Such reaction products are more thermally stable than soluble carbohydrates and may be readily transformable into fuel blends and other materials through conducting one or more downstream reforming reactions. In addition, the foregoing types of reaction products are good solvents in which a digestion may be performed, thereby promoting solubilization of soluble carbohydrates as their reaction products.

A particularly effective manner in which soluble carbohydrates may be formed and converted into more stable compounds is through conducting the digestion of cellulosic biomass in the presence of molecular hydrogen and a slurry catalyst capable of activating the molecular hydrogen (also referred to herein as a "hydrogen-activating catalyst"). That is, in such approaches (termed "in situ catalytic reduction reaction processes" herein), the digestion of cellulosic biomass and the catalytic reduction of soluble carbohydrates produced therefrom may take place in the same vessel. As used herein, the term "slurry catalyst" will refer to a catalyst comprising fluidly mobile catalyst particles that can be at least partially suspended in a fluid phase via gas flow, liquid flow, mechanical agitation, or any combination thereof. If the slurry catalyst is sufficiently well distributed in the cellulosic biomass, soluble carbohydrates formed during digestion may be intercepted and converted into more stable compounds before they have had an opportunity to significantly degrade, even under thermal conditions that otherwise promote their degradation. Without an adequate catalyst distribution being realized, soluble carbohydrates produced by in situ catalytic reduction reaction processes may still degrade before they have had an opportunity to encounter a catalytic site and undergo a stabilizing reaction. In situ catalytic reduction reaction processes may also be particularly advantageous from an energy efficiency standpoint, since digestion of cellulosic biomass is an endothermic process, whereas catalytic reduction reactions are exothermic. Thus, the excess heat generated by the in situ catalytic reduction reaction(s) may be utilized to drive the digestion with little opportunity for heat transfer loss to occur, thereby lowering the amount of additional heat energy input needed to conduct the digestion process.

Another issue associated with the processing of cellulosic biomass into fuel blends and other materials is created by the need for high conversion percentages of a cellulosic biomass charge into soluble carbohydrates. Specifically, as cellulosic biomass solids are digested, their size gradually decreases to the point that they can become fluidly mobile. As used herein, cellulosic biomass solids that are fluidly mobile, particularly cellulosic biomass solids that are about 3 mm in size or less, will be referred to as "cellulosic biomass fines." Cellulosic biomass fines can be transported out of a digestion zone of a system for converting cellulosic biomass and into one or more zones where solids are unwanted and can be detrimental. For example, cellulosic biomass fines have the potential to plug catalyst beds, transfer lines, valving, and the like. Furthermore, although small in size, cellulosic biomass fines may represent a non-trivial fraction of the cellulosic biomass charge, and if they are not further converted into soluble carbohydrates, the ability to attain a satisfactory conversion percentage may be impacted. Since the digestion processes of the paper and pulpwood industry are run at relatively low cellulosic biomass conversion percentages, smaller amounts of cellulosic biomass fines are believed to be generated and have a lesser impact on those digestion processes.

In addition to the desired carbohydrates, other substances may be present within cellulosic biomass that can be especially problematic to deal with in an energy- and cost-efficient manner. Sulfur- and/or nitrogen-containing amino acids or other catalyst poisons may be present in cellulosic biomass. If not removed or otherwise addressed, these catalyst poisons can impact the catalytic reduction reaction(s) used to stabilize soluble carbohydrates, thereby resulting in process downtime for catalyst regeneration and/or replacement and reducing the overall energy efficiency when restarting the process. This issue is particularly significant for in situ catalytic reduction reaction processes, where there is minimal opportunity to address the presence of catalyst poisons, at least without significantly increasing process complexity and cost. As mentioned above, lignin can also be particularly problematic to deal with when present during digestion. For example, significant quantities of lignin may lead to fouling of processing equipment, potentially leading to costly system down time. Moreover, since lignin is non-cellulosic in nature and is not converted into the same types of products that are formed from cellulosic materials, the relatively high quantities of lignin in cellulosic biomass may lead to a relatively low percentage of the raw cellulosic biomass being converted into desired substances per unit weight of feedstock.

As evidenced by the foregoing, the efficient conversion of cellulosic biomass into fuel blends and other materials is a complex problem that presents immense engineering challenges. The present disclosure addresses these challenges and provides related advantages as well.

SUMMARY

The present disclosure generally relates to digestion of cellulosic biomass solids, and, more specifically, to methods for digesting cellulosic biomass solids in the presence of a phenolic solvent.

In some embodiments, the present disclosure provides methods comprising: providing cellulosic biomass solids in a digestion medium comprising water and an organic solvent; heating the cellulosic biomass solids and the digestion medium in a digestion unit in the presence of molecular hydrogen and a slurry catalyst capable of activating molecular hydrogen, thereby forming an alcoholic component derived from the cellulosic biomass solids and liberating lignin from the cellulosic biomass solids, the lignin forming a phenolics liquid phase that is partitioned from the digestion medium and at least a portion of the slurry catalyst accumulating in the phenolics liquid phase as it forms; removing at least a portion of the phenolics liquid phase and the slurry catalyst accumulated therein from the digestion unit; converting at least a portion of the phenolics liquid phase into a phenolic solvent; and returning at least a portion of the phenolic solvent and the slurry catalyst to the digestion unit, the phenolic solvent becoming part of the digestion medium once returned to the digestion unit.

In one embodiment, the phenolic solvent and the slurry catalyst are returned to the digestion unit while heating the cellulosic biomass solids and the digestion medium. In some embodiments, the method further comprises heating the cellulosic biomass solids in the presence of the phenolic solvent, the molecular hydrogen, and the slurry catalyst to continue forming the alcoholic component. In one embodiment, the digestion medium comprises a two-phase mixture that is partitioned from the phenolics liquid phase. In another embodiment, the digestion medium comprises a one-phase mixture that is partitioned from the phenolics liquid phase.

In some embodiments, the method further comprises removing at least a portion of the alcoholic component from the digestion unit. In one embodiment, the method further comprises exposing the alcoholic component to a condensation catalyst, thereby forming a condensation reaction product. In another embodiment, the alcoholic component is admixed with the digestion medium when removed from the digestion unit. In one embodiment, the method further comprises returning at least a portion of the alcoholic component to the digestion unit. In one embodiment, the alcoholic component is returned to the digestion unit such that upwardly directed fluid flow is established therein.

In some embodiments, the phenolic solvent and the slurry catalyst are returned to the digestion unit such that upwardly directed fluid flow is established therein. In one embodiment, the upwardly directed fluid flow at least partially distributes the slurry catalyst within the cellulosic biomass solids in the digestion unit.

In some embodiments, the organic solvent comprises one or more phenolic compounds. In one embodiment, the one or more phenolic compounds comprises a compound selected from the group consisting of eugenol, dihydroeugenol, propoxylated phenols, methoxypropylated phenols, and any combination thereof. In some embodiments, the lignin in the phenolics liquid phase is converted into the phenolic solvent external to the digestion unit. In some embodiments, the lignin in the phenolics liquid phase is converted into the phenolic solvent by thermally depolymerizing the lignin, chemically hydrolyzing the lignin, or any combination thereof. In one embodiment, thermally depolymerizing the lignin comprises heating the phenolics liquid phase to a temperature of at least about 270° C. in the presence of molecular hydrogen and the slurry catalyst.

In some embodiments, the method further comprises measuring the viscosity of the phenolics liquid phase while converting the phenolics liquid phase into the phenolic solvent. In some embodiments, the alcoholic component is formed by a catalytic reduction reaction of soluble carbohydrates, the soluble carbohydrates being derived from the cellulosic biomass solids. In some embodiments, the slurry catalyst comprises a poison-tolerant catalyst. In one embodiment, the poison-tolerant catalyst comprises a sulfided catalyst.

The features and advantages of the present disclosure will be readily apparent to one having ordinary skill in the art upon a reading of the description of the preferred embodiments that follows.

BRIEF DESCRIPTION OF THE DRAWING

The following FIGURE is included to illustrate certain aspects of the present disclosure, and should not be viewed as an exclusive embodiment. The subject matter disclosed is capable of considerable modifications, alterations, combinations, and equivalents in form and function, as will occur to one having ordinary skill in the art and having the benefit of this disclosure.

FIG. 1 shows a schematic of an illustrative biomass conversion system in which lignin may be liberated from cellulosic biomass solids and further converted into a phenolic solvent that is returned to the cellulosic biomass solids.

DETAILED DESCRIPTION

The present disclosure generally relates to digestion of cellulosic biomass solids, and, more specifically, to methods for digesting cellulosic biomass solids in the presence of a phenolic solvent.

In the embodiments described herein, the digestion rate of cellulosic biomass solids may be accelerated in the presence of a digestion medium that comprises water and an organic solvent, which may be a phenolic solvent. In some instances, the digestion medium may be maintained at elevated pressures that keep the organic solvent in a liquid state when raised above its normal boiling point. Although the more rapid digestion rate of cellulosic biomass solids under elevated temperature and pressure conditions may be desirable from a throughput standpoint, soluble carbohydrates may be susceptible to degradation at elevated temperatures, as discussed above. As further discussed above, one approach for addressing the degradation of soluble carbohydrates during digestion is to conduct an in situ catalytic reduction reaction process so as to convert the soluble carbohydrates into more stable compounds as soon as possible after their formation.

Although digesting cellulosic biomass solids by an in situ catalytic reduction reaction process may be particularly advantageous for at least the reasons noted above, successfully executing such a coupled approach may be problematic in other aspects. One significant issue that may be encountered is that of adequate catalyst distribution within the digesting cellulosic biomass solids, since insufficient catalyst distribution can result in poor stabilization of soluble carbohydrates. Although a catalyst might be pre-mixed or co-blended with cellulosic biomass solids and then subjected to an in situ catalytic reduction reaction process, these solutions may still produce inadequate catalyst distribution and present significant engineering challenges that markedly increase process complexity and operational costs. In contrast, the present inventor discovered that fluid flow may be used as a relatively simple and low cost engineering solution to convey slurry catalyst particulates into the interstitial spaces within a charge of cellulosic biomass solids. Although the slurry catalyst may be conveyed into the cellulosic biomass solids using fluid flow from any direction, the present inventor considers it most effective to have at least a portion of the slurry catalyst be conveyed by upwardly directed fluid flow, or at least that upwardly directed fluid flow be present, since such fluid flow may promote expansion of the cellulosic biomass solids and disfavor gravity-induced compaction that occurs during their addition and digestion. Suitable techniques for using fluid flow to distribute a slurry catalyst within cellulosic biomass solids are described in commonly owned U.S. Patent Applications 61/665,727 and 61/665,627, each filed on Jun. 28, 2012 and incorporated herein by reference in its entirety. In addition to addressing the issue of catalyst distribution, the use of fluid flow in the foregoing manner may also solve the problem created by the production of cellulosic biomass fines, since they may be co-flowed with the slurry catalyst so that their continued digestion may take place.

As alluded to above, lignin can be an especially problematic component of cellulosic biomass solids, whose presence during digestion may need to be addressed in some manner, particularly as the lignin content builds. Lignin buildup may be especially problematic in continuously operating processes in which cellulosic biomass solids are supplied and digested on an ongoing basis. During such digestion processes, the lignin may predominantly separate from the digestion medium as a highly viscous and hydrophobic phenolics liquid phase, which is most typically pooled below the digestion medium. Formation of a phenolics liquid phase may significantly impact one's ability to successfully conduct an in situ catalytic reduction reaction process, since the phenolics liquid phase can increase the difficulty of distributing the slurry catalyst in the cellulosic biomass solids. Specifically, the slurry catalyst may be readily wetted by the phenolics liquid phase and accumulate therein over time, thereby making the catalyst less available for distribution within the cellulosic biomass solids. The high density and viscosity of this phase may make it difficult to liberate the slurry catalyst therefrom and redistribute the catalyst in the cellulosic biomass solids using fluid flow, thereby resulting in poor stabilization of soluble carbohydrates as an alcoholic component. Moreover, contact of the slurry catalyst with the phenolics liquid phase may be exceedingly detrimental for catalyst life.

As a solution to the foregoing issues, the inventor discovered that the lignin may be at least partially depolymerized to its constituent phenols in order to reduce the viscosity of this phase. As used herein, the phrases "at least partially depolymerize," "depolymerize at least a portion of" and grammatical equivalents thereof will be used synonymously with one another. Various techniques for processing a phenolics liquid phase to reduce its viscosity through depolymerization are described in commonly owned U.S. Patent Applications 61/720,689, 61/720,747, 61/720,757, 61/720,765 and 61/720,774, each filed on Oct. 31, 2012 and incorporated herein by reference in its entirety. Once the viscosity has been reduced, the slurry catalyst may be liberated from the phenolics liquid phase much more readily and returned to the cellulosic biomass solids for redistribution therein. Moreover, viscosity reduction was found to improve the lifetime of the slurry catalyst. Conversion of lignin into its constituent phenols represents a beneficial result, since these types of compounds are widely used in commercial products and a myriad of other industrial applications. Thus, transformation of the lignin in the foregoing manner not only helps promote the digestion of cellulosic biomass solids and formation of an alcoholic component therefrom, but it also increases the weight percentage of the raw cellulosic biomass solids that is transformed into useful substances. Unless otherwise processed as above, lignin represents a nuisance product that must eventually be disposed of, and the waste disposal costs must be factored into the valuation of fuel blends and other materials produced from cellulosic biomass solids. Although the constituent phenols formed from lignin may also be disposed of as a waste product stream, they may also be harvested for other uses or be fed forward with an alcoholic component undergoing transformation into a fuel blend or other material.

While investigating deviscosification of the phenolics liquid phase in the foregoing manner, the present inventor discovered that phenolic solvents may be used as a particularly effective type of solvent for dissolving cellulosic biomass solids to form soluble carbohydrates and an alcoholic component through an in situ catalytic reduction reaction process. Without being bound by any theory or mechanism, it is believed that the acidity of the phenolic hydroxyl group can desirably enhance the digestion of cellulosic biomass solids to produce soluble carbohydrates. In addition, phenolic solvents may present further advantages during digestion of cellulosic biomass solids. Specifically, due to their high boiling points and different chemical structures compared to low molecular weight alcohol solvents, phenolic solvents can decrease the formation of solvent-derived light ends byproducts during digestion that are not readily convertible into fuel blends. Moreover, the high boiling points of phenolic solvents may allow lower pressures to be used during digestion.

Although phenolic solvents being provided to cellulosic biomass solids may be supplied from any source, the present inventor recognized that the opportunity to supply phenolic solvents from an internal source (i.e., the constituent phenols derived from lignin) may be particularly advantageous. First, it may reduce the need to supply an external source of organic solvent, which may decrease processing costs. Second, since phenolic solvents are particularly effective for promoting digestion of cellulosic biomass solids, the overall quantity of organic solvent may be reduced in many instances. Third, due to the significant quantities of lignin present in most types of cellulosic biomass solids, ample supply of the phenolic solvents is not believed to be an issue. Fourth, generation of phenolic solvents from lignin increases the overall percentage of raw cellulosic biomass solids that are transformed into useful substances. Finally, generation of phenolic solvents from lignin represents an environmentally friendly source of these solvents.

Phenolic solvents may be at least partially miscible with water. Accordingly, they may be used in conjunction with digestion processes in which water is a significant component of the digestion medium. Use of a digestion medium comprising water may better promote the formation of the phenolics liquid phase to provide a source of the phenolic solvent, as alluded to above. By promoting the formation of a phenolics liquid phase during digestion, the lignin can be kept in a defined location and better managed during the digestion process. Management of the lignin may include deviscosifying the phenolics liquid phase and redistributing the slurry catalyst that has accumulated therein.

Moreover, the advantages of using a phenolic solvent during digestion of cellulosic biomass solids may be realized when using the phenolic solvent alone or in combination with other organic solvents, including those formed by a catalytic reduction reaction of soluble carbohydrates. In regard to the foregoing, the phenolic solvent may be present when commencing the digestion process, or the phenolic solvent may be added once digestion has already begun. That is, in some embodiments, another organic solvent may be used to start up the digestion process, and the phenolic solvent may be introduced thereafter, while the digestion process is ongoing. Introduction of the phenolic solvent after digestion has already commenced may provide the time needed for a stockpile of the phenolic solvent to build after lignin has been liberated from the cellulosic biomass solids and converted to its constituent phenols according to the methods described herein.

As used herein, the term "digestion medium" will refer to a continuous fluid phase in contact with cellulosic biomass solids undergoing digestion. In the embodiments described herein, the digestion medium may comprise water and an organic solvent.

As used herein, the terms "phenolic solvent" or "phenolic compound" will refer to substances that contain an aromatic ring and at least one phenolic hydroxyl group bound to the aromatic ring.

As used herein, the term "partitioned" refers to the separation of two substantially immiscible fluid phases from one another.

Unless otherwise specified, it is to be understood that use of the terms "biomass" or "cellulosic biomass" in the description herein refers to "cellulosic biomass solids." Solids may be in any size, shape, or form. The cellulosic biomass solids may be natively present in any of these solid sizes, shapes, or forms, or they may be further processed prior to digestion. In some embodiments, the cellulosic biomass solids may be chopped, ground, shredded, pulverized, and the like to produce a desired size prior to digestion. In some or other embodiments, the cellulosic biomass solids may be washed (e.g., with water, an acid, a base, combinations thereof, and the like) prior to digestion taking place.

In practicing the present embodiments, any type of suitable cellulosic biomass source may be used. Suitable cellulosic biomass sources may include, for example, forestry residues, agricultural residues, herbaceous material, municipal solid wastes, waste and recycled paper, pulp and paper mill residues, and any combination thereof. Thus, in some embodiments, a suitable cellulosic biomass may include, for example, corn stover, straw, bagasse, miscanthus, sorghum residue, switch grass, bamboo, water hyacinth, hardwood, hardwood chips, hardwood pulp, softwood, softwood chips, softwood pulp, and any combination thereof. Leaves, roots, seeds, stalks, husks, and the like may be used as a source of the cellulosic biomass. Common sources of cellulosic biomass may include, for example, agricultural wastes (e.g., corn stalks, straw, seed hulls, sugarcane leavings, nut shells, and the like), wood materials (e.g., wood or bark, sawdust, timber slash, mill scrap, and the like), municipal waste (e.g., waste paper, yard clippings or debris, and the like), and energy crops (e.g., poplars, willows, switch grass, alfalfa, prairie bluestream, corn, soybeans, and the like). The cellulosic biomass may be chosen based upon considerations such as, for example, cellulose and/or hemicellulose content, lignin content, growing time/season, growing location/transportation cost, growing costs, harvesting costs, and the like.

Illustrative carbohydrates that may be present in cellulosic biomass solids include, for example, sugars, sugar alcohols, celluloses, lignocelluloses, hemicelluloses, and any combination thereof. Once soluble carbohydrates have been produced through digestion according to the embodiments described herein, the soluble carbohydrates may be transformed into a more stable reaction product comprising an alcoholic component, which may comprise a monohydric alcohol, a glycol, a triol, or any combination thereof. As used herein, the term "glycol" will refer to compounds containing two alcohol functional groups, two alcohol functional groups and a carbonyl functionality, or any combination thereof. As used herein, the term "carbonyl functionality" will refer to an aldehyde functionality or a ketone functionality. As used herein, the term "triol" will refer to compounds containing three alcohol functional groups, three alcohol functional groups and a carbonyl functionality, and any combination thereof. As used herein, the term "monohydric alcohol" will refer to compounds containing one alcohol functional group, one alcohol functional group and a carbonyl functionality, and any combination thereof.

In various embodiments, digestion of cellulosic biomass solids may take place in the presence of a phenolic solvent. In some embodiments, the digestion process may be commenced with a phenolic solvent as a startup organic solvent within the digestion medium. In other embodiments, the digestion process may be commenced with a startup organic solvent that is non-phenolic in nature, and the phenolic solvent may be introduced thereafter. In this regard, suitable non-phenolic startup solvents that may be present in the digestion medium include, but are not limited to, ethanol, isopropanol, ethylene glycol, glycerol, methyl isobutyl carbinol (MIBC), tetrahydrofurfural alcohol (THFA), and the like. Suitable phenolic startup solvents that may be present in the digestion medium include, for example, eugenol, dihydroeugenol, propoxylated phenols, methoxypropoxylated phenols, and the like. As discussed hereinafter, in some embodiments, the phenolic solvent may be formed from a component of the cellulosic biomass solids that are undergoing digestion, specifically lignin, and the phenolic solvent may be returned to the cellulosic biomass solids, where it may become part of the digestion medium.

In some embodiments, methods for digesting cellulosic biomass solids may comprise: providing cellulosic biomass solids in a digestion medium comprising water and an organic solvent; heating the cellulosic biomass solids and the digestion medium in a digestion unit in the presence of molecular hydrogen and a slurry catalyst capable of activating molecular hydrogen, thereby forming an alcoholic component derived from the cellulosic biomass solids and liberating lignin from the cellulosic biomass solids, the lignin forming a phenolics liquid phase that is partitioned from the digestion medium and at least a portion of the slurry catalyst accumulating in the digestion medium as it forms; removing at least a portion of the phenolics liquid phase and the slurry catalyst accumulated therein from the digestion unit; converting at least a portion of the phenolics liquid phase into a phenolic solvent; and returning at least a portion of the phenolic solvent to the digestion unit, the phenolic solvent becoming part of the digestion medium once returned to the digestion unit.

In some embodiments, the phenolic solvent and the slurry catalyst may be returned to the digestion unit while heating the cellulosic biomass solids and the digestion medium. In some embodiments, the methods may further comprise heating the cellulosic biomass solids in the presence of the phenolic solvent, the molecular hydrogen, and the slurry catalyst to continue forming the alcoholic component. That is, in such embodiments, the phenolic solvent may be generated from lignin in the cellulosic biomass solids that are undergoing digestion, and the phenolic solvent may be returned to the cellulosic biomass solids while digestion continues to take place. Although the phenolic solvent may be formed externally from the digestion unit and subsequently be returned thereto in the foregoing manner, it is to be recognized that in other embodiments, the phenolic solvent may be formed directly in the digestion unit, where the phenolic solvent may become part of the digestion medium present therein.

In some embodiments, the alcoholic component may be formed by a catalytic reduction reaction of soluble carbohydrates, where the soluble carbohydrates are derived from the cellulosic biomass solids (i.e., from the cellulose or cellulose-like materials therein). The alcoholic component formed from the cellulosic biomass solids is not believed to be particularly limited in structure, other than being defined to some degree by the carbohydrate structure of the parent cellulose or cellulose-like material. Illustrative alcoholic components that may be formed from cellulosic biomass solids include, for example, monohydric alcohols, glycols, and triols, including variants of these substances that contain a residual carbonyl functionality (i.e., an aldehyde or a ketone functionality). In some embodiments, the alcoholic component can include $C_2$ or greater alcohols, or $C_4$ or greater alcohols. In some or other embodiments, the initially formed alcoholic component may undergo further reduction to form a hydrocarbon or undergo self-condensation, such as an acid-catalyzed Aldol reaction, to produce a higher molecular weight compound.

In some embodiments, the catalytic reduction reaction used to produce the alcoholic component may take place at a temperature ranging between about 110° C. and about 300° C., or between about 170° C. and about 300° C., or between about 180° C. and about 290° C., or between about 150° C. and about 250° C. In some embodiments, the catalytic reduction reaction may take place at a pH ranging between about 7 and about 13, or between about 10 and about 12. In other embodiments, the catalytic reduction reaction may take place under acidic conditions, such as a pH of about 5 to about 7. In some embodiments, the catalytic reduction reaction may be conducted under a hydrogen partial pressure ranging between about 1 bar (absolute) and about 150 bar, or between about 15 bar and about 140 bar, or between about 30 bar and about 130 bar, or between about 50 bar and about 110 bar.

In some embodiments, heating of the cellulosic biomass solids and the digestion medium to form soluble carbohydrates and liberate lignin from the cellulosic biomass solids may take place while the cellulosic biomass solids are in a pressurized state. As used herein, the term "pressurized state" will refer to a pressure that is greater than atmospheric pressure (1 bar). Heating the digestion medium in a pressurized state may allow the normal boiling point of the organic solvent to be exceeded, thereby allowing the digestion rate to be increased relative to that of lower temperature digestion processes. In some embodiments, heating the cellulosic biomass solids and the digestion medium may take place at a pressure of at least about 30 bar. In some embodiments, heating the cellulosic biomass solids and the digestion medium may take place at a pressure of at least about 60 bar, or at a pressure of at least about 90 bar. In some embodiments, heating the cellulosic biomass solids and the digestion medium may take place at a pressure ranging between about 30 bar and about 430 bar. In some embodiments, heating the cellulosic biomass solids and the digestion medium may take place at a pressure ranging between about 50 bar and about 330 bar, or at a pressure ranging between about 70 bar and about 130 bar, or at a pressure ranging between about 30 bar and about 130 bar.

In various embodiments, the digestion medium may comprise between about 1% to about 99% water by volume, with the balance of the digestion medium being comprised by one or more organic solvents. In some embodiments, the digestion medium may comprise between about 10% to about 95% water by volume. In other embodiments, the digestion solvent may comprise between about 10% to about 90% water by volume, or between about 40% to about 90% water by volume, or between about 50% to about 90% water by volume, or between about 60% to about 90% water by volume, or between about 70% to about 90% water by volume, or between about 80% to about 90% water by volume, or between about 90% to about 99% water by volume.

Depending on the quantities of water and organic solvent present in the digestion medium and other factors, the digestion medium may be in various forms during the digestion process. In some embodiments, the water and the organic solvent may be substantially miscible with one another, and the digestion medium may comprise a one-phase mixture that is partitioned from the phenolics liquid phase. In other embodiments, the water and the organic solvent may be at least partially immiscible with one another, and the digestion medium may comprise a two-phase mixture that is partitioned from the phenolics liquid phase. In the latter embodiments, three distinct fluid phases may be present while the cellulosic biomass solids are undergoing digestion. In addition to the composition of the digestion medium, other factors that may impact the observed number of phases during digestion include the extent to which the alcoholic component has been formed, the solubility of the alcoholic component in the digestion medium, and the extent to which the phenolics liquid phase has been formed. For example, as the digestion process proceeds, an initially one-phase digestion medium may convert into a two-phase digestion medium as greater quantities of the alcoholic component are formed. In some embodiments, the alcoholic component generated from the cellulosic biomass solids may be at least partially present as a light organics phase on top of a more dense aqueous phase. Generally, the phenolics liquid phase is the lower phase when partitioned from the various phases of the digestion medium, but the position of this phase may shift depending on the composition of the digestion medium and the extent to which the alcoholic component has been formed.

In some embodiments, the digestion medium may initially comprise an organic solvent as a startup digestion solvent, and the phenolic solvent may be added to the digestion medium thereafter. Suitable startup digestion solvents are set forth hereinabove and may include an alcohol or a ketone solvent, for example. In other embodiments, the organic solvent may comprise a phenolic solvent. That is, in such embodiments, the digestion of cellulosic biomass solids may both be started up with a phenolic solvent, and a phenolic solvent may be generated in situ from the lignin in the cellulosic biomass solids. When other organic solvents are present, an amount of the phenolic solvent in the digestion medium may range between about 5% to about 35% of the digestion medium by volume. In some embodiments, a startup phenolic solvent may include a biologically derived source of the phenolic solvent. In this regard, illustrative biologically derived phenolic solvents that may be used as a startup digestion solvent in the embodiments described herein include, for example, eugenol, dihydroeugenol, propoxylated phenols, methoxypropoxylated phenols, and the like. Propoxylated phenols and methoxypropoxylated phenols, in particular, may be obtained via decomposition of the polymer backbone of lignin. In some embodiments, lignin waste from the paper and pulpwood industry may be converted into its constituent phenolic compounds and supplied to cellulosic biomass solids undergoing digestion according to the processes described herein.

The location in which the phenolic solvent is formed from lignin is not believed to be particularly limited. In some embodiments, the lignin in the phenolics liquid phase may be converted into the phenolic solvent while the phenolics liquid phase is located within the digestion unit and while digestion is taking place. In other embodiments, the lignin in the phenolics liquid phase may be converted into the phenolic solvent external to the digestion unit, in which case the phenolic solvent and slurry catalyst therein may be conveyed to the digestion unit with a return flow of the phenolic solvent. In some embodiments, the phenolic solvent and the slurry catalyst may be returned to the digestion unit such that upwardly directed fluid flow is established therein. As described above, upwardly directed fluid flow can discourage compaction of the cellulosic biomass solids and promote distribution of the slurry catalyst within the cellulosic biomass solids. In some embodiments, the upwardly directed fluid flow of the phenolic solvent may at least partially distribute the slurry catalyst within the cellulosic biomass solids in the digestion unit. As discussed below, other sources of upwardly directed fluid flow may also be present in addition to the upwardly directed fluid flow provided by the phenolic solvent being returned to the digestion unit. The additional sources of upwardly directed fluid flow may likewise promote distribution of the slurry catalyst in the cellulosic biomass solids.

In general, any suitable technique can be used to convert lignin in the phenolics liquid phase into the phenolic solvent. Suitable techniques for affecting such a conversion may include, for example, thermally depolymerizing the lignin, chemically hydrolyzing the lignin, or any combination thereof. Although any suitable technique can be used to affect at least partial depolymerization of the lignin in the phenolics liquid phase, the inventor found hydrotreating to present particular advantages. Specifically, the inventor found that by heating the lignin in the phenolics liquid phase to a temperature of at least about 250° C. in the presence of molecular hydrogen and the slurry catalyst, the lignin was at least partially depolymerized, as discussed hereinafter. Thermal depolymerization of the phenolics liquid phase in the foregoing manner may beneficially make use of the slurry catalyst that has accumulated in this phase.

In some embodiments, thermally depolymerizing the lignin may comprise heating the phenolics liquid phase to a temperature of at least about 250° C. in the presence of molecular hydrogen and the slurry catalyst. Accumulated slurry catalyst in the phenolics liquid phase may be sufficient to affect thermal depolymerization of the lignin, or additional slurry catalyst may be added, if needed. In some embodiments, thermally depolymerizing the lignin may comprise heating the phenolics liquid phase to a temperature of at least about 250° C. in the presence of the slurry catalyst and molecular hydrogen, or a temperature of at least about 260° C., or of at least about 265° C., or of at least about 270° C., or at least about 275° C., or at least about 280° C., or at least about 285° C., or at least about 290° C., or at least about 295° C., or at least about 300° C. In some embodiments, thermal depolymerization of the lignin may take place by heating the phenolics liquid phase to a temperature ranging between about 250° C. and about 330° C., or between about 260° C. and about 320° C., or between about 270° C. and about 300° C., or between about 250° C. and about 300° C., or between about 260° C. and about 290° C., or between about 270° C. and about 290° C.

In some embodiments, digestion of the cellulosic biomass solids may be conducted at a temperature sufficient to thermally depolymerize at least a portion of the lignin in the phenolics liquid phase during the digestion process. In such embodiments, the phenolic solvent generated from the lignin may be removed from the digestion unit and then be subsequently returned thereto in a return flow. In other embodiments, digestion of the cellulosic biomass solids may be conducted at a temperature that is insufficient to depolymerize the lignin in the phenolics liquid phase during digestion. The phenolics liquid phase may then be conveyed from the digestion unit, and the lignin may be thermally depolymerized to form the phenolic solvent for subsequent return to the digestion unit.

In some embodiments, methods described herein may further comprise measuring the viscosity of the phenolics liquid phase while converting the phenolics liquid phase into the phenolic solvent. Suitable techniques for monitoring the viscosity of the phenolics liquid phase may include viscometry and rheometry, as described in commonly owned U.S. Patent Application 61/720,726, incorporated by reference hereinabove. Measuring the viscosity of the phenolics liquid phase can be beneficial to determine if the lignin has been depolymerized to a sufficient degree to form adequate quantities of the phenolic solvent. The viscosity of the phenolics liquid phase may be measured in the digestion unit or external to the digestion unit. Suitable devices and techniques for measuring the viscosity of the phenolics liquid phase will depend upon the location of its measurement, as will be evident to one having ordinary skill in the art.

In some embodiments, methods described herein may further comprise removing at least a portion of the alcoholic component from the digestion unit. Removal of the alcoholic component from the digestion unit may allow the alcoholic component to be further reformed into a fuel blend or other material. As described above, the alcoholic component may be admixed with the digestion medium, or the alcoholic component may be present as a light organics phase that is partitioned from the digestion medium. Moreover, in various embodiments, the alcoholic component may be removed from the digestion unit separately from the phenolics liquid phase, or the alcoholic component may be at least partially admixed with the phenolics liquid phase when removed from the digestion unit. Techniques for processing an alcoholic component, either separated or admixed with a phenolics liquid phase, are described in commonly owned U.S. Patent Applications, 61/720,689 and 61/720,747, incorporated by reference hereinabove.

In some embodiments, the methods described herein may further comprise returning at least a portion of the alcoholic component to the digestion unit. Return of the alcoholic component to the digestion unit may supplement the organic solvent of the digestion medium with the alcoholic component. In some embodiments, the alcoholic component may be returned to the digestion unit such that upwardly directed fluid flow is established therein. The upwardly directed fluid flow of the alcoholic component may be present in combination with the upwardly directed fluid flow provided by the phenolic solvent being returned to the digestion unit. Return of the alcoholic component to the digestion unit as an upwardly directed fluid flow may be used to realize the same benefits generally discussed above.

In some embodiments, the methods described herein may further comprise exposing the alcoholic component to a condensation catalyst, thereby forming a condensation reaction product. In various embodiments, the alcoholic component may be exposed to the condensation catalyst after its removal from the digestion unit. Additional disclosure regarding condensation reaction processes and suitable condensation catalysts is provided hereinbelow.

When removing the alcoholic component from the digestion unit (e.g., in the digestion medium), it may be desirable in some embodiments to remove the slurry catalyst from the alcoholic component before processing the alcoholic component further. For instance, it may be desirable to remove the slurry catalyst from the alcoholic component before introducing the alcoholic component to a fixed bed catalyst. Illustrative techniques that may be used to separate the slurry catalyst from the alcoholic component include, for example, filtration, centrifugation, gravity-induced settling, hydroclone separation, and the like. In more particular embodiments, separating the slurry catalyst from the alcoholic component may take place by cross-flow filtration of the alcoholic component. As one of ordinary skill in the art will recognize, cross-flow filtration techniques rely upon passage of a fluid phase through a porous medium, where a majority of the fluid phase and any solids present therein pass tangential to the fluid phase passing through the porous medium. One of ordinary skill in the art will further recognize that cross-flow filtration techniques may be particularly advantageous in continuously operating processes for digesting cellulosic biomass solids, since such filtration techniques may be carried out continuously without periodically stopping the filtration process to backflush the filters. In embodiments in which cross-flow filtration of the alcoholic component is carried out, the portion of the alcoholic component passing through the porous medium of the cross-flow filtration apparatus may carried forward and further processed (e.g., via conducting a condensation reaction on the alcoholic component). Other operations such as removing water from the alcoholic component, for example, may also be conducted prior to performing a condensation reaction, since it may be desirable to protect a downstream condensation catalyst from exposure to excessive quantities of water. Suitable techniques for removing water from an alcoholic component are described in commonly owned U.S. Patent Applications 61/720,689 and 61/720,747, incorporated by reference hereinabove. The portion of the alcoholic component not passing through the porous medium may contain residual slurry catalyst particulates, and the alcoholic component and residual slurry catalyst particulates may be recirculated to the digestion unit as a return flow. Moreover, in some embodiments, the phenolic solvent may be removed from the alcoholic component before further reforming of the alcoholic component takes place.

In some embodiments, catalysts capable of activating molecular hydrogen and conducting a catalytic reduction reaction may comprise a metal such as, for example, Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. In some embodiments, the catalysts and promoters may allow for hydrogenation and hydrogenolysis reactions to occur at the same time or in succession of one another. In some embodiments, such catalysts may also comprise a carbonaceous pyropolymer catalyst containing transition metals (e.g., Cr, Mo, W, Re, Mn, Cu, and Cd) or Group VIII metals (e.g., Fe, Co, Ni, Pt, Pd, Rh, Ru, Ir, and Os). In some embodiments, the foregoing catalysts may be combined with an alkaline earth metal oxide or adhered to a catalytically active support. In some or other embodiments, the catalyst capable of activating molecular hydrogen may be deposited on a catalyst support that is not itself catalytically active.

In some embodiments, the catalyst that is capable of activating molecular hydrogen may comprise a slurry catalyst. In some embodiments, the slurry catalyst may comprise a poison-tolerant catalyst. As used herein the term "poison-tolerant catalyst" refers to a catalyst that is capable of activating molecular hydrogen without needing to be regenerated or replaced due to low catalytic activity for at least about 12 hours of continuous operation. Use of a poison-tolerant catalyst may be particularly desirable when reacting soluble carbohydrates derived from cellulosic biomass solids that have not had catalyst poisons removed therefrom. Catalysts that are not poison tolerant may also be used to achieve a similar result, but they may need to be regenerated or replaced more frequently than does a poison-tolerant catalyst.

In some embodiments, suitable poison-tolerant catalysts may include, for example, sulfided catalysts. In some or other embodiments, nitrided catalysts may be used as poison-tolerant catalysts. Sulfided catalysts suitable for activating molecular hydrogen are described in commonly owned U.S. patent application Ser. No. 13/495,785, filed on Jun. 13, 2012, and 61/553,591, filed on Oct. 31, 2011, each of which is incorporated herein by reference in its entirety. Sulfiding may take place by treating the catalyst with hydrogen sulfide or an alternative sulfiding agent, optionally while the catalyst is disposed on a solid support. In more particular embodiments, the poison-tolerant catalyst may comprise a sulfided cobalt-molybdate catalyst, such as a catalyst comprising about 1-10 wt. % cobalt oxide and up to about 30 wt. % molybdenum trioxide. In other embodiments, catalysts containing Pt or Pd may also be effective poison-tolerant catalysts for use in the techniques described herein. When mediating in situ catalytic reduction reaction processes, sulfided catalysts may be particularly well suited to form reaction products comprising a substantial fraction of glycols (e.g., $C_2$-$C_6$ glycols) without producing excessive amounts of the corresponding monohydric alcohols. Although poison-tolerant catalysts, particularly sulfided catalysts, may be well suited for forming glycols from soluble carbohydrates, it is to be recognized that other types of catalysts, which may not necessarily be poison-tolerant, may also be used to achieve a like result in alternative embodiments. As will be recognized by one having ordinary skill in the art, various reaction parameters (e.g., temperature, pressure, catalyst composition, introduction of other components, and the like) may be modified to favor the formation of a desired reaction product. Given the benefit of the present disclosure, one having ordinary skill in the art will be able to alter various reaction parameters to change the product distribution obtained from a particular catalyst and set of reactants.

In some embodiments, slurry catalysts suitable for use in the methods described herein may be sulfided by dispersing a slurry catalyst in a fluid phase and adding a sulfiding agent thereto. Suitable sulfiding agents may include, for example, organic sulfoxides (e.g., dimethyl sulfoxide), hydrogen sulfide, salts of hydrogen sulfide (e.g., NaSH), and the like. In some embodiments, the slurry catalyst may be concentrated in the fluid phase after sulfiding, and the concentrated slurry may then be distributed in the cellulosic biomass solids using fluid flow. Illustrative techniques for catalyst sulfiding that may be used in conjunction with the methods described herein are described in U.S. patent application Ser. No. 12/407,479 (U.S. Patent Application Publication No. 20100236988), filed on Mar. 19, 2009 and incorporated herein by reference in its entirety.

In various embodiments, slurry catalysts used in conjunction with the methods described herein may have a particulate size of about 250 microns or less. In some embodiments, the slurry catalyst may have a particulate size of about 100 microns or less, or about 10 microns or less. In some embodiments, the minimum particulate size of the slurry catalyst may be about 1 micron. In some embodiments, the slurry catalyst may comprise catalyst fines in the processes described herein. As used herein, the term "catalyst fines" refers to solid catalysts having a nominal particulate size of about 100 microns or less. Catalyst fines may be generated from catalyst production processes, for example, during extrusion of solid catalysts. Catalyst fines may also be produced by grinding larger catalyst solids or during regeneration of catalyst solids. Suitable methods for producing catalyst fines are described in U.S. Pat. Nos. 6,030,915 and 6,127,229, each of which is incorporated herein by reference in its entirety. In some instances, catalyst fines may be intentionally removed from a solid catalyst production run, since they may be difficult to sequester in some catalytic processes. Techniques for removing catalyst fines from larger catalyst solids may include, for example, sieving or like size separation processes. When conducting in situ catalytic reduction reaction processes, such as those described herein, catalyst fines may be particularly well suited, since they can be easily fluidized and distributed in the interstitial pore space of the digesting cellulosic biomass solids.

Catalysts that are not particularly poison-tolerant may also be used in conjunction with the techniques described herein. Such catalysts may include, for example, Ru, Pt, Pd, or compounds thereof disposed on a solid support such as, for example, Ru on titanium dioxide or Ru on carbon. Although such catalysts may not have particular poison tolerance, they may be regenerable, such as through exposure of the catalyst to water at elevated temperatures, which may be in either a subcritical state or a supercritical state.

In some embodiments, the catalysts used in conjunction with the processes described herein may be operable to generate molecular hydrogen. For example, in some embodiments, catalysts suitable for aqueous phase reforming (i.e., APR catalysts) may be used. Suitable APR catalysts may include, for example, catalysts comprising Pt, Pd, Ru, Ni, Co, or other Group VIII metals alloyed or modified with Re, Mo, Sn, or other metals. Thus, in some embodiments described herein, an external hydrogen feed may not be needed in order to effectively carry out the stabilization of soluble carbohydrates by a catalytic reduction reaction. However, in other embodiments, an external hydrogen feed may be used, optionally in combination with internally generated hydrogen.

In some embodiments, the molecular hydrogen may be externally supplied to the cellulosic biomass solids. For example, in some embodiments, the molecular hydrogen may be supplied as an upwardly directed fluid stream. Benefits of supplying an upwardly directed fluid stream have been described herein. In some or other embodiments, the molecular hydrogen may be generated internally through use of an APR catalyst.

In various embodiments described herein, a slurry catalyst may be at least partially distributed within a charge of cellulosic biomass solids using fluid flow, particularly upwardly directed fluid flow. As used herein, the terms "distribute," "distribution," and variants thereof refer to a condition in which a slurry catalyst is present at all heights of a charge of cellulosic biomass. No particular degree of distribution is implied by use of the term "distribute" or its variants. In some embodiments, the distribution may comprise a substantially homogeneous distribution, such that a concentration of the slurry catalyst is substantially the same at all heights of a cellulosic biomass charge. In other embodiments, the distribution may comprise a heterogeneous distribution, such that different concentrations of the slurry catalyst are present at various heights of the cellulosic biomass charge. When a heterogeneous distribution of the slurry catalyst is present, a concentration of the slurry catalyst within the cellulosic biomass solids may increase from top to bottom in some embodiments or decrease from top to bottom in other embodiments. In some embodiments, a heterogeneous distribution may comprise an irregular concentration gradient.

In some embodiments, the methods described herein may further comprise supplying upwardly directed fluid flow through the cellulosic biomass solids. In various embodiments, the upwardly directed fluid flow may comprise a gas stream, a liquid stream, or any combination thereof. In some embodiments, the upwardly directed fluid flow may comprise one upwardly directed fluid stream, or two upwardly directed fluid streams, or three upwardly directed fluid streams, or four upwardly directed fluid streams, or five upwardly directed fluid streams.

In some embodiments, at least some of the one or more upwardly directed fluid streams may contain the slurry catalyst at its source. That is, the fluid stream(s) may comprise a stream of the slurry catalyst. For example, the slurry catalyst may be contained in a return flow of the phenolic solvent to the digestion unit. The one or more upwardly directed fluid streams may convey the slurry catalyst therein, thereby at least partially distributing the slurry catalyst in the cellulosic biomass solids. In some embodiments, the upwardly directed fluid stream may comprise a circulating liquid containing the slurry catalyst therein. In other embodiments, the one or more upwardly directed fluid streams may not contain the slurry catalyst at its source, but they may still fluidize slurry catalyst located in or near the cellulosic biomass solids. For example, a gas stream may not contain the slurry catalyst at its source, but it may still promote fluidization of slurry catalyst in or near the cellulosic biomass solids. A liquid stream lacking the slurry catalyst may promote fluidization of slurry catalyst in or near the cellulosic biomass solids in a manner like that described for a gas stream.

In some embodiments, the one or more upwardly directed fluid streams may comprise a gas stream. For example, in some embodiments, a gas stream being used for upwardly directed fluid flow may comprise a stream of molecular hydrogen. In some or other embodiments, steam, compressed air, or an inert gas such as nitrogen, for example, may be used in place of or in addition to a stream of molecular hydrogen. Up to about 40% steam may be present in the fluid stream in various embodiments. An upwardly directed gas stream may be used to distribute the slurry catalyst within the cellulosic biomass solids when a liquid stream alone is insufficient to distribute the slurry catalyst, for example. When used alone, a gas stream generally does not convey the slurry catalyst beyond a liquid head comprising the digestion medium surrounding the cellulosic biomass solids.

In some embodiments, the one or more upwardly directed fluid streams may comprise a liquid stream. An upwardly directed liquid stream may be used to distribute the slurry catalyst within the cellulosic biomass solids when it is not necessarily desired to maintain the slurry catalyst within the cellulosic biomass solids and/or a gas stream alone is insufficient to distribute the slurry catalyst, for example. Unlike a gas stream, described above, a liquid stream may, in some embodiments, convey the slurry catalyst through the cellulosic biomass solids, add to the liquid head surrounding the cellulosic biomass solids, and eventually spill over. In other embodiments, slurry catalyst fluidization may be incomplete, and a liquid stream may still not convey the slurry catalyst completely through the cellulosic biomass solids before the liquid head spills over.

In some embodiments, the digestion unit may be charged with a fixed amount of slurry catalyst, while cellulosic biomass solids are continuously or semi-continuously fed thereto, thereby allowing digestion to take place in a continual manner. That is, fresh cellulosic biomass solids may be added to the digestion unit on an ongoing basis or an as-needed basis in order to replenish cellulosic biomass solids that have been digested to form soluble carbohydrates. In some embodiments, the cellulosic biomass solids may be continuously or semi-continuously added to the digestion unit while the digestion unit is in a pressurized state. In some embodiments, the pressurized state may comprise a pressure of at least about 30 bar. Without the ability to introduce fresh cellulosic biomass solids to a pressurized digestion unit, depressurization and cooling of the digestion unit may take place during biomass addition, significantly reducing the energy- and cost-efficiency of the biomass conversion process. As used herein, the term "continuous addition" and grammatical equivalents thereof will refer to a process in which cellulosic biomass solids are added to a digestion unit in an uninterrupted manner without fully depressurizing the digestion unit. As used herein, the term "semi-continuous addition" and grammatical equivalents thereof will refer to a discontinuous, but as-needed, addition of cellulosic biomass solids to a digestion unit without fully depressurizing the digestion unit. Techniques through which cellulosic biomass solids may be added continuously or semi-continuously to a pressurized digestion unit are discussed in more detail hereinbelow.

In some embodiments, cellulosic biomass solids being continuously or semi-continuously added to the digestion unit may be pressurized before being added to the digestion unit, particularly when the digestion unit is in a pressurized state. Pressurization of the cellulosic biomass solids from atmospheric pressure to a pressurized state may take place in one or more pressurization zones before addition of the cellulosic biomass solids to the digestion unit. Suitable pressurization zones that may be used for pressurizing and introducing cellulosic biomass solids to a pressurized digestion unit are described in more detail in commonly owned U.S. patent application Ser. Nos. 13/332,322 and 13/332,329, each filed on Dec. 20, 2011, and incorporated herein by reference in its entirety. Suitable pressurization zones described therein may include, for example, pressure vessels, pressurized screw feeders, and the like. In some embodiments, multiple pressurization zones may be connected in series to increase the pressure of the cellulosic biomass solids in a stepwise manner.

In some embodiments, the alcoholic component produced from the cellulosic biomass solids may be further reformed through any combination and sequence of further hydrogenolysis reactions and/or hydrogenation reactions, condensation reactions, isomerization reactions, oligomerization reactions, hydrotreating reactions, alkylation reactions, dehydration reactions, desulfurization reactions, and the like. The subsequent reforming reactions may be catalytic or non-catalytic. In some embodiments, an initial operation of downstream reforming may comprise a condensation reaction, often conducted in the presence of a condensation catalyst, in which the alcoholic component or a product formed therefrom is condensed with another molecule to form a higher molecular weight compound.

In some embodiments, methods described herein may further comprise further processing the alcoholic component produced from the cellulosic biomass solids into a fuel blend or other material, after removing the alcoholic component from the digestion unit. For example, in some embodiments, the alcoholic component may undergo a downstream reforming reaction such as a condensation reaction, after removal from the digestion unit. Additional disclosure regarding condensation reactions and catalysts suitable for promoting condensation reactions follows hereinbelow. When removed from the digestion unit, the alcoholic component may be present as a discrete phase, or it may be admixed with the digestion medium when removed from the digestion unit. For example, the alcoholic component may be present as a discrete phase if its concentration exceeds the solubility limit in the digestion medium. Alcoholic components that are present as a discrete phase or admixed with the digestion medium may be directly fed to a condensation catalyst for downstream reforming, or the alcoholic component may be separated from the digestion medium prior to downstream reforming. Removal of the alcoholic component from the digestion medium may take place by extraction, distillation, or the like.

As used herein, the term "condensation reaction" will refer to a chemical transformation in which two or more molecules are coupled with one another to form a carbon-carbon bond in a higher molecular weight compound, usually accompanied by the loss of a small molecule such as water or an alcohol. An illustrative condensation reaction is the Aldol condensation reaction, which will be familiar to one having ordinary skill in the art. Additional disclosure regarding condensation reactions and catalysts suitable for promoting condensation reactions is provided hereinbelow. Ordinarily, alcohols do not directly undergo condensation reactions, although they are not expressly precluded from doing so. Instead, in order to undergo a condensation reaction, an alcohol is usually transformed into a carbonyl compound or a compound that may subsequently react to form a carbonyl compound. The transformation to form the carbonyl compound may take place in concert with the condensation reaction or occur in a discrete conversion prior to the condensation reaction. Suitable transformations for converting alcohols into carbonyl compounds or compounds that may be transformed into carbonyl compounds include, for example, dehydrogenation reactions, dehydration reactions, oxidation reactions, or any combination thereof. When the carbonyl compound is formed catalytically, the same catalyst or a different catalyst than that used to carry out the condensation reaction may be used.

In some instances it may be desirable to conduct one or more further catalytic reduction reactions on the alcoholic component before conducting a condensation reaction on the alcoholic component. Conducting a further catalytic reduction reaction may comprise increasing a quantity of the alcoholic component, increasing the amount of soluble carbohydrates that are transformed into the alcoholic component, and/or further decreasing the degree of oxygenation of the alcoholic component. Choice of whether to perform a further catalytic reduction reaction may be made, for example, based upon whether sufficient quantities of the alcoholic component have been formed and/or if further stabilization of soluble carbohydrates is desired.

In some embodiments, the catalyst used for mediating a further catalytic reduction reaction may be the same catalyst used for mediating the catalytic reduction reaction in the digestion unit. In other embodiments, different catalysts may be used. For example, in some embodiments, a slurry catalyst may be used to mediate the catalytic reduction reaction in the digestion unit, and a fixed bed catalyst may be used to mediate the further catalytic reduction reaction. In other embodiments, a poison-tolerant catalyst may be used to mediate the catalytic reduction reaction in the digestion unit, and a non-poison-tolerant catalyst may be used to mediate the further catalytic reduction reaction. In still other embodiments, a first poison-tolerant catalyst may be used to mediate the catalytic reduction reaction in the digestion unit, and a second poison-tolerant catalyst may be used to mediate the further catalytic reduction reaction. For example, in some embodiments, a poison-tolerant slurry catalyst may be used to mediate the catalytic reduction reaction in the digestion unit, and a fixed bed poison-tolerant catalyst may be used to mediate the further catalytic reduction reaction external to the digestion unit.

In some embodiments, the first operation of further reforming the alcoholic component may comprise a condensation reaction. Ordinarily, alcohols do not directly undergo condensation reactions, although they are not expressly precluded from doing so. Instead, in order to undergo a condensation reaction, an alcohol is usually converted into a carbonyl compound or a compound that may subsequently react to form a carbonyl compound. The transformation to form the carbonyl compound may take place in concert with the condensation reaction or occur in a discrete conversion prior to the condensation reaction. Suitable transformations for converting alcohols into carbonyl compounds or compounds that may be transformed into carbonyl compounds include, for example, dehydrogenation reactions, dehydration reactions, oxidation reactions, or any combination thereof. When the carbonyl compound is formed catalytically, the same catalyst or a different catalyst than that used to carry out the condensation reaction may be used.

Although a number of different types of catalysts may be used for mediating condensation reactions, zeolite catalysts may be particularly advantageous in this regard. One zeolite catalyst that may be particularly well suited for mediating condensation reactions of alcohols is ZSM-5 (Zeolite Socony Mobil 5), a pentasil aluminosilicate zeolite having a composition of $Na_nAl_nSi_{96-n}O_{192}\cdot16H_2O$ (0<n<27), which may transform an alcohol feed into a condensation product. Without being bound by any theory or mechanism, it is believed that this catalyst may promote condensation of alcohols in a concerted manner by mediating a dehydrogenation reaction to produce a carbonyl compound which subsequently undergoes the desired condensation reaction. Other suitable zeolite catalysts may include, for example, ZSM-12, ZSM-22, ZSM-23, SAPO-11, and SAPO-41. Additional types of suitable condensation catalysts are also discussed in more detail herein.

In various embodiments, the condensation reaction may take place at a temperature ranging between about 5° C. and about 500° C. The condensation reaction may take place in a condensed phase (e.g., a liquor phase) or in a vapor phase. For condensation reactions taking place in a vapor phase, the temperature may range between about 75° C. and about 500° C., or between about 125° C. and about 450° C. For condensation reactions taking place in a condensed phase, the temperature may range between about 5° C. and about 475° C., or between about 15° C. and about 300° C., or between about 20° C. and about 250° C.

In various embodiments, the higher molecular weight compound produced by the condensation reaction may comprise $\geq C_4$ hydrocarbons. In some or other embodiments, the higher molecular weight compound produced by the condensation reaction may comprise $\geq C_6$ hydrocarbons In some embodiments, the higher molecular weight compound produced by the condensation reaction may comprise $C_4$-$C_{30}$ hydrocarbons. In some embodiments, the higher molecular weight compound produced by the condensation reaction may comprise $C_6$-$C_{30}$ hydrocarbons. In still other embodiments, the higher molecular weight compound produced by the condensation reaction may comprise $C_4$-$C_{24}$ hydrocarbons, or $C_6$-$C_{24}$ hydrocarbons, or $C_4$-$C_{18}$ hydrocarbons, or $C_6$-$C_{18}$ hydrocarbons, or $C_4$-$C_{12}$ hydrocarbons, or $C_6$-$C_{12}$ hydrocarbons. As used herein, the term "hydrocarbons" refers to compounds containing both carbon and hydrogen without reference to other elements that may be present. Thus, heteroatom-substituted compounds are also described herein by the term "hydrocarbons."

The particular composition of the higher molecular weight compound produced by the condensation reaction may vary depending on the catalyst(s) and temperatures used for both the catalytic reduction reaction and the condensation reaction, as well as other parameters such as pressure. For example, in some embodiments, the product of the condensation reaction may comprise $\geq C_4$ alcohols and/or ketones that are produced concurrently with or in lieu of $\geq C_4$ hydrocarbons. In some embodiments, the $\geq C_4$ hydrocarbons produced by the condensation reaction may contain various olefins in addition to alkanes of various sizes, typically branched alkanes. In still other embodiments, the $\geq C_4$ hydrocarbons produced by the condensation reaction may also comprise cyclic hydrocarbons and/or aromatic compounds. In some embodiments, the higher molecular weight compound produced by the condensation reaction may be further subjected to a catalytic reduction reaction to transform a carbonyl functionality therein to an alcohol and/or a hydrocarbon and to convert olefins into alkanes.

Exemplary compounds that may be produced by a condensation reaction include, for example, $\geq C_4$ alkanes, $\geq C_4$ alkenes, $\geq C_5$ cycloalkanes, $\geq C_5$ cycloalkenes, aryls, fused aryls, $\geq C_4$ alcohols, $\geq C_4$ ketones, and mixtures thereof. The $\geq C_4$ alkanes and $\geq C_4$ alkenes may range from 4 to about 30 carbon atoms (i.e. $C_4$-$C_{30}$ alkanes and $C_4$-$C_{30}$ alkenes) and may be branched or straight chain alkanes or alkenes. The $\geq C_4$ alkanes and $\geq C_4$ alkenes may also include fractions of $C_7$-$C_{14}$, $C_{12}$-$C_{24}$ alkanes and alkenes, respectively, with the $C_7$-$C_{14}$ fraction directed to jet fuel blends, and the $C_{12}$-$C_{24}$ fraction directed to diesel fuel blends and other industrial applications. Examples of various $\geq C_4$ alkanes and $\geq C_4$ alkenes that may be produced by the condensation reaction include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethylhexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The $\geq C_5$ cycloalkanes and $\geq C_5$ cycloalkenes may have from 5 to about 30 carbon atoms and may be unsubstituted, mono-substituted or multi-substituted. In the case of mono-substituted and multi-substituted compounds, the substituted group may include a branched $\geq C_3$ alkyl, a straight chain $\geq C_1$ alkyl, a branched $\geq C_3$ alkylene, a straight chain $\geq C_1$ alkylene, a straight chain $\geq C_2$ alkylene, an aryl group, or a combination thereof. In some embodiments, at least one of the substituted groups may include a branched $C_3$-$C_{12}$ alkyl, a straight chain $C_1$-$C_{12}$ alkyl, a branched $C_3$-$C_{12}$ alkylene, a straight chain $C_1$-$C_{12}$ alkylene, a straight chain $C_2$-$C_{12}$ alkylene, an aryl group, or a combination thereof. In yet other embodiments, at least one of the substituted groups may include a branched $C_3$-$C_4$ alkyl, a straight chain $C_1$-$C_4$ alkyl, a branched $C_3$-$C_4$ alkylene, a straight chain $C_1$-$C_4$ alkylene, a straight chain $C_2$-$C_4$ alkylene, an aryl group, or any combination thereof. Examples of $\geq C_5$ cycloalkanes and $\geq C_5$ cycloalkenes that may be produced by the condensation reaction include, without limitation, cyclopentane, cyclopentene, cyclohexane, cyclohexene, methylcyclopentane, methylcyclopentene, ethylcyclopentane, ethylcyclopentene, ethylcyclohexane, ethylcyclohexene, and isomers thereof.

The moderate fractions of the condensation reaction, such as $C_7$-$C_{14}$, may be separated for jet fuel, while heavier fractions, such as $C_{12}$-$C_{24}$, may be separated for diesel use. The heaviest fractions may be used as lubricants or cracked to produce additional gasoline and/or diesel fractions. The $\geq C_4$ compounds may also find use as industrial chemicals, whether as an intermediate or an end product. For example, the aryl compounds toluene, xylene, ethylbenzene, para-xylene, meta-xylene, and ortho-xylene may find use as chemical intermediates for the production of plastics and other products. Meanwhile, $C_9$ aromatic compounds and fused aryl compounds, such as naphthalene, anthracene, tetrahydronaphthalene, and decahydronaphthalene, may find use as solvents or additives in industrial processes.

In some embodiments, a single catalyst may mediate the transformation of the alcoholic component into a form suitable for undergoing a condensation reaction as well as mediating the condensation reaction itself. In other embodiments, a first catalyst may be used to mediate the transformation of the alcoholic component into a form suitable for undergoing a condensation reaction, and a second catalyst may be used to mediate the condensation reaction. Unless otherwise specified, it is to be understood that reference herein to a condensation reaction and condensation catalyst refers to either type of condensation process. Further disclosure of suitable condensation catalysts now follows.

In some embodiments, a single catalyst may be used to form a higher molecular weight compound via a condensation reaction. Without being bound by any theory or mechanism, it is believed that such catalysts may mediate an initial dehydrogenation of the alcoholic component, followed by a condensation reaction of the dehydrogenated alcoholic component. Zeolite catalysts are one type of catalyst suitable for directly converting alcohols to condensation products in such a manner. A particularly suitable zeolite catalyst in this regard may be ZSM-5, although other zeolite catalysts may also be suitable.

In some embodiments, two catalysts may be used to form a higher molecular weight compound via a condensation reaction. Without being bound by any theory or mechanism, it is believed that the first catalyst may mediate an initial dehydrogenation of the alcoholic component, and the second catalyst may mediate a condensation reaction of the dehydrogenated alcoholic component. Like the single-catalyst embodiments discussed previously above, in some embodiments, zeolite catalysts may be used as either the first catalyst or the second catalyst. Again, a particularly suitable zeolite catalyst in this regard may be ZSM-5, although other zeolite catalysts may also be suitable.

Various catalytic processes may be used to form higher molecular weight compounds by a condensation reaction. In some embodiments, the catalyst used for mediating a condensation reaction may comprise a basic site, or both an acidic site and a basic site. Catalysts comprising both an acidic site and a basic site will be referred to herein as multi-functional catalysts. In some or other embodiments, a catalyst used for mediating a condensation reaction may comprise one or more metal atoms. Any of the condensation catalysts may also optionally be disposed on a solid support, if desired.

In some embodiments, the condensation catalyst may comprise a basic catalyst comprising Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In some embodiments, the basic catalyst may also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In some embodiments, the basic catalyst may comprise a mixed-oxide basic catalyst. Suitable mixed-oxide basic catalysts may comprise, for example, Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combination thereof. In some embodiments, the condensation catalyst may further include a metal or alloys comprising metals such as, for example, Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Use of metals in the condensation catalyst may be desirable when a dehydrogenation reaction is to be carried out in concert with the condensation reaction. Basic resins may include resins that exhibit basic functionality. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a hydrotalcite material derived from a combination of MgO and $Al_2O_3$. In some embodiments, the condensation catalyst may comprise a zinc aluminate spinel formed from a combination of ZnO and $Al_2O_3$. In still other embodiments, the condensation catalyst may comprise a combination of ZnO, $Al_2O_3$, and CuO. Each of these materials may also contain an additional metal or alloy, including those more generally referenced above for basic condensation catalysts. In more particular embodiments, the additional metal or alloy may comprise a Group 10 metal such Pd, Pt, or any combination thereof.

In some embodiments, the condensation catalyst may comprise a basic catalyst comprising a metal oxide containing, for example, Cu, Ni, Zn, V, Zr, or any mixture thereof. In some or other embodiments, the condensation catalyst may comprise a zinc aluminate containing, for example, Pt, Pd, Cu, Ni, or any mixture thereof.

In some embodiments, the condensation catalyst may comprise a multi-functional catalyst having both an acidic functionality and a basic functionality. Such condensation catalysts may comprise a hydrotalcite, a zinc-aluminate, a phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the multi-functional catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and any combination thereof. In some embodiments, the multi-functional catalyst may include a metal such as, for example, Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a metal oxide containing Pd, Pt, Cu or Ni. In still other embodiments, the condensation catalyst may comprise an aluminate or a zirconium metal oxide containing Mg and Cu, Pt, Pd or Ni. In still other embodiments, a multi-functional catalyst may comprise a hydroxyapatite (HAP) combined with one or more of the above metals.

In some embodiments, the condensation catalyst may also include a zeolite and other microporous supports that contain Group IA compounds, such as Li, Na, K, Cs and Rb. Preferably, the Group IA material may be present in an amount less than that required to neutralize the acidic nature of the support. A metal function may also be provided by the addition of group VIIIB metals, or Cu, Ga, In, Zn or Sn. In some embodiments, the condensation catalyst may be derived from the combination of MgO and $Al_2O_3$ to form a hydrotalcite material. Another condensation catalyst may comprise a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

The condensation reaction mediated by the condensation catalyst may be carried out in any reactor of suitable design, including continuous-flow, batch, semi-batch or multi-system reactors, without limitation as to design, size, geometry, flow rates, and the like. The reactor system may also use a fluidized catalytic bed system, a swing bed system, fixed bed system, a moving bed system, or a combination of the above.

In some embodiments, bi-phasic (e.g., liquid-liquid) and triphasic (e.g., liquid-liquid-solid) reactors may be used to carry out the condensation reaction.

In some embodiments, an acid catalyst may be used to optionally dehydrate at least a portion of the reaction product. Suitable acid catalysts for use in the dehydration reaction may include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst may also include a modifier. Suitable modifiers may include, for example, La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst may also include a metal. Suitable metals may include, for example, Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in a fluid.

The embodiments described herein will now be described with further reference to the drawing. FIG. 1 shows a schematic of an illustrative biomass conversion system in which lignin may be liberated from cellulosic biomass solids and further converted into a phenolic solvent that is returned to the cellulosic biomass solids. In FIG. 1, biomass conversion system 1 includes digestion unit 2 to which cellulosic biomass solids may be added via solids introduction mechanism 4. Solids introduction mechanism 4 may comprise loading mechanism 6 and pressure transition zone 8, which may elevate the cellulosic biomass solids from atmospheric pressure to a pressure near that of the operating pressure of digestion unit 2, thereby allowing continuous or semi-continuous introduction of cellulosic biomass solids to take place without fully depressurizing digestion unit 2. Valves 7 and 7' may provide pressure isolation in pressure transition zone 8. Suitable loading mechanisms and pressure transition zones have been described in more detail hereinabove.

Digestion unit 2 contains cellulosic biomass solids, a digestion medium comprising water and an organic solvent, and a slurry catalyst. In the interest of clarity, the slurry catalyst and the cellulosic biomass solids have not been depicted in the FIGURE. The organic solvent may comprise a phenolic solvent as digestion is commenced, or the digestion process may be started with a different organic solvent, and the phenolic solvent may be added thereafter. After digestion of the cellulosic biomass solids has proceeded for a period of time, the digestion medium and a phenolics liquid phase may become partitioned from one another. As depicted in FIG. 1, the digestion medium and alcoholic component therein may occupy region 10 of digestion unit 2, and the phenolics liquid phase may occupy region 12 of digestion unit 2. An upwardly directed gas flow may be supplied via line 22, such as an upwardly directed flow of molecular hydrogen.

The phenolics liquid phase and slurry catalyst therein may be removed from digestion unit 2 via line 14 and conveyed to lignin processing unit 16. In lignin processing unit 16, at least a portion of the lignin in the phenolics liquid phase may be converted into a phenolic solvent. Thereafter, the phenolic solvent and slurry catalyst may be returned to digestion unit 2 as an upwardly directed fluid flow via lines 18 and 20. As depicted in FIG. 1, line 20 represents a combined recirculation flow of the phenolic solvent and an alcoholic component produced from the cellulosic biomass solids, but it to be recognized that these substances may be reintroduced to digestion unit 2 via separate fluid return flows, if desired. Removal of the phenolics liquid phase from digestion unit 2 may take place continuously or non-continuously, depending on the quantity of the phenolics liquid phase and its viscosity, for example.

The alcoholic component in the digestion medium may be removed from digestion unit 2 via line 24. The alcoholic component may then undergo further processing into a fuel blend or other material. Optionally, the alcoholic component may undergo a further catalytic reduction reaction in reactor 26. The further catalytic reduction reaction may further transform soluble carbohydrates into an alcoholic component and/or decrease the degree of oxygenation of an alcoholic component that has already been formed in digestion unit 2.

Optionally, a portion of the alcoholic component may be returned to digestion unit 2 via lines 28 and 20. As mentioned above, the return flow of the alcoholic component may be combined with the phenolic solvent being returned to digestion unit 2 as an upwardly directed fluid flow, or separate streams of the alcoholic component and the phenolic solvent may be maintained.

The alcoholic component not being returned to digestion unit 2 may be carried forward for further processing. Optionally, the alcoholic component may be conveyed to separation mechanism 30 in which the alcoholic component may be separated from at least a portion of the digestion medium. Separation techniques that may take place in separation mechanism 30 include solvent extraction, distillation, and the like. Waste material may exit separation mechanism 30 via line 32 for disposal or other processing steps.

The separated or enriched alcoholic component may pass to condensation reactor 36 via line 34. The condensation reaction product produced in condensation reactor 36 may be removed via line 38 for subsequent processing into a fuel blend or like material. Although only one condensation reactor has been depicted in FIG. 1, it is to be understood that any number of condensation reactors may be present and utilized for reforming the alcoholic component. Moreover, additional reforming reactors may be present in addition to the condensation reactor. Additional reforming reactions that may be conducted may include any combination of further catalytic reduction reactions (e.g., hydrogenation reactions, hydrogenolysis reactions, hydrotreating reactions, and the like), further condensation reactions, isomerization reactions, desulfurization reactions, dehydration reactions, oligomerization reactions, alkylation reactions, and the like. Such transformations may be used to convert the initially produced soluble carbohydrates into a fuel blend or other material. Such fuel blends may include, for example, gasoline hydrocarbons, diesel fuels, jet fuels, and the like. As used herein, the term "gasoline hydrocarbons" refers to substances comprising predominantly $C_5$-$C_9$ hydrocarbons and having a boiling point of 32° C. to about 204° C. More generally, any fuel blend meeting the requirements of ASTM D2887 may be classified as a gasoline hydrocarbon. Suitable gasoline hydrocarbons may include, for example, straight run gasoline, naphtha, fluidized or thermally catalytically cracked gasoline, VB gasoline, and coker gasoline. As used herein, the term "diesel fuel" refers to substances comprising paraffinic hydrocarbons and having a boiling point ranging between about 187° C. and about 417° C., which is suitable for use in a compression ignition engine. More generally, any fuel blend meeting the requirements of ASTM D975 may also be defined as a diesel fuel. As used herein, the term "jet fuel" refers to substances meeting the requirements of ASTM D1655.

To facilitate a better understanding of the present invention, the following examples of preferred or representative embodiments are given. In no way should the following examples be read to limit, or to define, the scope of the invention.

EXAMPLES

Gas chromatography was conducted using a 60 m×0.32 mm ID DB-5 column of 1 μm thickness, with 50:1 split ratio, 2 mL/min helium flow, and column oven held at 40° C. for 8 minutes, followed by ramp to 285° C. at 10° C./min, and a hold time of 53.5 minutes. The injector temperature was set at 250° C., and the detector temperature was set at 300° C.

Example 1

Multi-Cycle Reaction with a Water Digestion Medium

A 75 mL Parr 5000 reactor was charged with 20 g of deionized water, 0.3 g of sodium carbonate buffer and 0.504 g of sulfided nickel oxide promoted cobalt molybdate catalyst (DC-2534, Criterion Catalyst & Technologies L.P., containing 1-10% cobalt oxide and molybdenum trioxide (up to 30 wt %) on alumina, and less than 2% nickel). The catalyst was previously sulfided as described in United States Patent Application Publication 2010/0236988, which is incorporated herein by reference in its entirety. 2.7 g of southern pine mini-chips (39% moisture, having a nominal size of 3 mm×5 mm×5 mm) were added, and the reactor was pressurized with 52 bar of hydrogen under magnetic stirring. Thereafter, the reactor was heated to 240° C. for 5 hours. Three cycles of wood addition and heating under hydrogen were conducted, and additional sodium carbonate buffer was added between cycles as needed to maintain the pH at 5-7. At the end of three cycles, the reactor contents were separated by filtration. The recovered solids were dried overnight at 90° C. to assess the extent of digestion. Based on the quantity of recovered solids, 78% of the wood chips were digested into liquid soluble products.

Gas chromatography of the filtrate showed a range of alkanes, monooxygenated aldehydes and ketones, glycols, and polyols in the filtrate, each with a volatility greater than the $C_6$ sugar alcohol sorbitol. Ethylene glycol, 1,2-propylene glycol, and glycerol were all observed. GC indicated a selectivity of 48% of the products with a volatility greater than sorbitol, relative to the initial carbohydrate content of the wood chips.

Example 2

Multi-Cycle Reaction with a Water/Isopropanol Digestion Medium

Example 1 was repeated with a digestion medium comprising 50% isopropanol/50% deionized water. The percentage digestion increased to 88%, and the GC selectivity increased to 90%.

Example 3

Single-Cycle Reaction with a Water/Ethanol Digestion Medium

Example 1 was repeated for a single cycle with a digestion medium comprising 50% ethanol/50% deionized water. In this example, 0.12 g of sodium carbonate buffer was used. Heating was conducted at 190° C. for one hour, followed by heating for two hours at 250° C. The percentage digestion was 82%, and the GC selectivity was 78%.

Example 4

Single-Cycle Reaction with an o-Cresol-Saturated Water Digestion Medium

Example 3 was repeated for a single cycle with a digestion medium comprising water saturated with o-cresol. The percentage digestion was 67%, and the GC selectivity was 83%. Examination of the undigested wood via optical microscopy showed individual strands of wood fiber of less than 3 microns in diameter. In contrast, the undigested wood of Examples 1-3 showed intact wood particles that retained a wood grain appearance.

Example 5

Multi-Cycle Reaction with an o-Cresol-Saturated Water Digestion Medium

Example 4 was repeated with extension to four hours of heating at 250° C. Three cycles of wood addition were conducted. In each cycle, digestion was conducted at a hydrogen partial pressure of 52 bar. The percentage digestion was 95%, and the GC selectivity was 148%. GC selectivity values in excess of 100% suggest conversion of the lignin or another non-cellulosic material into GC-measurable products.

Example 6

Multi-Cycle Reaction with an o-Cresol-Saturated Water Digestion Medium

Example 5 was repeated, except the hydrogen partial pressure was lowered to 26 bar. The percentage digestion in this case was 99%, and the GC selectivity was 103%.

Example 7

Multi-Cycle Reaction with a 5% Water in o-Cresol Digestion Medium

Example 1 was repeated over 6 cycles of wood chip addition with a 5% deionized water in o-cresol digestion medium. Heating was conducted at 190° C. for one hour, followed 2.5 hours of heating at 250° C. The GC selectivity was 135%. GC-MS indicted the formation of phenolic compounds including methoxypropyl phenol, propyl phenol, and dimethyl phenols.

Example 8

Comparative Digestion of Lignin in Ethanol/Water Digestion Medium

A Parr 5000 reactor with a glass liner was charged with 17 g of 35% ethanol in deionized water, 1.8 g of Alcell lignin (Aldrich), 0.10 g of potassium carbonate buffer, and 0.5 g of sulfided cobalt molybdate catalyst. The reactor was pressurized to 35 bar with hydrogen. Heating was conducted for one hour at 190° C., followed by four hours of heating at 250° C. GC analysis showed only 10% conversion of the lignin to measurable products.

Example 9

Comparative Digestion of Lignin in Water/o-Cresol Digestion Medium

Example 8 was repeated, except the digestion medium was changed to 17% water in o-cresol. In this case, 64% of the lignin was converted to GC-measurable products.

Example 10

Formation of a Phenolics Liquid Phase in the Presence of a Water Digestion Medium A 100 mL Parr reactor was charged with 60.18 g deionized water, 0.754 g sulfided cobalt molybdate catalyst, 5.05 g southern pine mini-chips, and 0.195 g potassium carbonate buffer. The reactor was pressurized with 766 psia of hydrogen and heated to 190° C. for one hour, followed by ramping over 15 minutes to a temperature of 250° C. and holding to complete a 5 hour reaction cycle. Eight reaction cycles were conducted, after which time a 0.5 micron sintered metal dip tube used for sampling plugged. Upon examination of the reactor contents, a heavy bottoms phase was observed. The bottoms phase could not be made to flow upon heating to 110° C., indicating a viscosity of greater than 10,000 cP. The high viscosity indicates that significant lignin depolymerization likely did not occur under these reaction conditions.

Example 11

Formation of a Phenolics Liquid Phase in the Presence of a Water/Ethanol Digestion Medium Example 10 was repeated with 60.06 g of 25% ethanol in water and 0.749 g sulfided cobalt molybdate catalyst. The reactor was pressurized with 52 bar of hydrogen and heated at 190° C. for one hour, at 250° C. for three hours, and at 270° C. for two hours. After eight reaction cycles, a viscous phase was observed in the reactor, but it had a room temperature viscosity of only about 1,000 cP or greater. The reduced viscosity indicates that lignin depolymerization may have occurred under these reaction conditions.

Example 12

Formation of a Phenolics Liquid Phase in the Presence of a Water/Ethanol Digestion Medium Example 11 was repeated, except the digestion medium was changed to 50% ethanol in water. A viscous phase was observed in the reactor after 10 cycles, and its viscosity was greater than 10,000 cP. The reactor was then subjected to five hours of heating under 52 bar of hydrogen at 290° C. After the reaction under hydrogen, the viscosity was reduced to less than about 500 cP. The reduced viscosity implies that lignin depolymerization may have occurred under these reaction conditions.

Example 13

Formation of a Phenolics Liquid Phase in the Presence of a Water/o-Cresol Digestion Medium Example 12 was repeated with 55.46 g o-cresol and 3.5 g deionized water as the digestion medium in the presence of 1.8 g sulfided cobalt molybdate catalyst. The hydrogen pressure was 52 bar. Heating during each reaction cycle was conducted at 190° C. for one hour, followed by heating for four hours at 250° C. By the sixth cycle, two liquid phases were observed, where the phenolic layer was below an aqueous-rich upper layer. After 15 cycles, the phases inverted, with the phenolic layer now being the lower layer. At cycle 18, a medium viscosity lower tar layer was observed that coated the internals of the reactor. The tar layer remained flowable, leading to an estimated viscosity of 1,000 cP of greater.

Example 14

Formation of a Phenolic Solvent from Wood Chips in the Presence of an Alcohol Solvent Example 13 was repeated using 4-methyl-2-pentanol (methyl isobutyl carbinol, MIBC) as the digestion medium, and with the use of larger scale batches conducted in a 450 mL Parr reactor. The reactor was initially charged with 220.06 g of MIBC, 25.08 g of deionized water, 0.855 g of potassium carbonate buffer, and 8.1065 g of sulfided cobalt molybdate catalyst. For each reaction cycle, 27 g of softwood pine mini-chips were added, and an equivalent amount of liquid sample was removed at the end of each cycle. For liquid sample removal, a portion of the lower aqueous layer was removed from above a layer of settled catalyst, followed by removal of a sufficient amount of the upper layer, if required, to maintain the liquid inventory in the reactor at a 60% level. After 17 cycles, a sample of the upper layer was distilled at atmospheric pressure under nitrogen, followed by vacuum distillation at 10 torr. With a kettle temperature of 258° C.-302° C., a vacuum distillation cut containing an estimated 30% of the reactor product was obtained. The GC-MS analysis of the distillate composition is outlined in Table 1. In addition to alcohols (including glycols and other diols), significant quantities of phenolic compounds were obtained. For example, methoxy propyl phenol was found to be present in quantities greater than 4%. Tetrahydrofurfural alcohol was also found as a significant reaction product. No observable viscous layer or tar was formed under the experimental conditions.

TABLE 1

| Retention Time (min.) | Peak Identity | % Composition of Distillate |
|---|---|---|
| 16.895 | 1-butanol | n/d |
| 19.082 | 4-methyl-2-pentanol | n/d |
| 19.474 | 1-pentanol | 0.37% |
| 20.254 | cyclopentanol | 1.57% |
| 20.954 | propylene glycol | 1.36% |
| 21.067 | butanoic acid | 0.17% |
| 21.548 | methyl cyclopentanol | 0.88% |
| 21.771 | unknown | 0.20% |
| 22.419 | $C_8H_{16}$ | 0.11% |
| 22.596 | cyclohexanol | 0.25% |
| 23.086 | tetrahydrofuranmethanol/butanediol | 4.74% |
| 23.300 | dimethylhexanol | 0.35% |
| 23.395 | methylcyclohexanol | 0.18% |
| 23.505 | $C_8H_{16}O$ | 0.48% |
| 23.661 | ethylcyclopentanone | 0.49% |
| 24.196 | pentanediol | 0.14% |

TABLE 1-continued

| Retention Time (min.) | Peak Identity | % Composition of Distillate |
|---|---|---|
| 24.244 | $C_6H_{12}O_2$ | 0.16% |
| 24.511 | $C_{10}H_{20}O_2$ | 0.20% |
| 24.597 | pentanediol | 1.29% |
| 24.710 | unknown | 0.18% |
| 24.771 | unknown | 0.14% |
| 24.936 | unknown | 0.21% |
| 25.190 | unknown | 0.09% |
| 25.482 | cyclopentanediol | 0.83% |
| 25.709 | phenol | 0.34% |
| 25.781 | cyclopentanediol | 0.60% |
| 25.829 | unknown | 0.30% |
| 25.979 | unknown | 0.17% |
| 26.311 | unknown | 0.34% |
| 26.415 | methoxy phenol | 1.02% |
| 26.606 | unknown | 0.51% |
| 26.700 | unknown | 0.38% |
| 26.831 | methyl phenol | 0.40% |
| 27.066 | unknown | 0.15% |
| 27.144 | unknown | 0.15% |
| 27.324 | unknown | 0.16% |
| 27.379 | unknown | 0.22% |
| 27.646 | unknown | 0.19% |
| 27.782 | methyl methoxy phenol | 0.47% |
| 28.006 | ethyl phenol | 0.43% |
| 28.670 | unknown | 0.18% |
| 28.978 | ethyl methoxy phenol | 1.20% |
| 29.259 | propyl phenol | 1.00% |
| 29.928 | benzene diol | 0.39% |
| 30.352 | propyl methoxy phenol | 4.81% |
| 30.428 | unknown | 0.68% |
| 30.564 | unknown | 0.15% |
| 33.239 | unknown | 0.22% |
| 35.590 | propyl benzene diol | 1.01% |

Examples 15-17

Simulated Trickle Bed Digestion in the Presence of Various Solvents

Three 75 mL Parr 5000 reactors were charged with 8 g of southern pine mini-chips and 0.25 g of potassium carbonate buffer. Water-saturated digestion medium was prepared by shaking 12 g of a selected solvent and 4 g of deionized water for 5 minutes, followed by gravity settling for 30 minutes. The solvents were as follows: 1-octanol (Example 15) and o-cresol (Example 16). In Example 17, only deionized water was used. The excess water in Examples 15 and 16 was removed, and the solvent was mixed with 0.6 g sulfided cobalt molybdate catalyst. The solvent was slurried to suspend the catalyst, and the catalyst suspension was transferred via polyethylene pipet to the top of the wood chip bed over a uniform cross-section of the reactor to simulate trickle bed contacting.

After adding the catalyst and the digestion solvent, the reactors were pressurized with 52 bar of hydrogen. Heating was then conducted at 190° C. for 1 hour, at 240° C. for 3 hours, and at 270° C. for 2 hours. At the end of the heating sequence, the reactor contents were separated by vacuum filtration. The recovered solids were dried overnight at 90° C., and the recovered liquid was assayed by GC. For Example 15, 83% of the wood chips were digested, and the GC selectivity was 66%. For Example 16, 97% of the wood chips were digested, and the GC selectivity was 173%. For Example 17, 66% of the wood chips were digested, and the GC selectivity was only 18%. Thus, these examples again show the superiority of organic solvents, particularly a phenolic solvent, in the digestion of wood chips.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing cellulosic biomass solids in a digestion medium comprising water and an organic solvent;
heating the cellulosic biomass solids and the digestion medium in a digestion unit in the presence of molecular hydrogen and a slurry catalyst capable of activating molecular hydrogen, thereby forming an alcoholic component derived from the cellulosic biomass solids and liberating lignin from the cellulosic biomass solids, the lignin forming a phenolics liquid phase that is partitioned from the digestion medium and at least a portion of the slurry catalyst accumulating in the phenolics liquid phase as it forms;
removing at least a portion of the phenolics liquid phase and the slurry catalyst accumulated therein from the digestion unit;
converting at least a portion of the phenolics liquid phase into a phenolic solvent; and
returning at least a portion of the phenolic solvent and the slurry catalyst to the digestion unit, the phenolic solvent becoming part of the digestion medium once returned to the digestion unit, wherein the phenolic solvent and the slurry catalyst are returned to the digestion unit such that upwardly directed fluid flow is established therein;
wherein the digestion medium comprises at least one of a one-phase mixture that is partitioned from the phenolics liquid phase and a two-phase mixture that is partitioned from the phenolics liquid phase.

2. The method of claim 1, wherein the phenolic solvent and the slurry catalyst are returned to the digestion unit while heating the cellulosic biomass solids and the digestion medium.

3. The method of claim 2, further comprising:
heating the cellulosic biomass solids in the presence of the phenolic solvent, the molecular hydrogen, and the slurry catalyst to continue forming the alcoholic component.

4. The method of claim 1, further comprising:
removing at least a portion of the alcoholic component from the digestion unit.

5. The method of claim 4, further comprising:
exposing the alcoholic component to a condensation catalyst, thereby forming a condensation reaction product.

6. The method of claim 4, wherein the alcoholic component is admixed with the digestion medium when removed from the digestion unit.

7. The method of claim 6, further comprising:
returning at least a portion of the alcoholic component to the digestion unit.

8. The method of claim 7, wherein the alcoholic component is returned to the digestion unit such that upwardly directed fluid flow is established therein.

9. The method of claim 1, wherein the upwardly directed fluid flow at least partially distributes the slurry catalyst within the cellulosic biomass solids in the digestion unit.

10. The method of claim 1, wherein the organic solvent comprises one or more phenolic compounds.

11. The method of claim 10, wherein the one or more phenolic compounds comprises a compound selected from the group consisting of eugenol, dihydroeugenol, propoxylated phenols, methoxypropylated phenols, and any combination thereof.

12. The method of claim 1, wherein the lignin in the phenolics liquid phase is converted into the phenolic solvent external to the digestion unit.

13. The method of claim 1, wherein the lignin in the phenolics liquid phase is converted into the phenolic solvent by thermally depolymerizing the lignin, chemically hydrolyzing the lignin, or any combination thereof.

14. The method of claim 13, wherein thermally depolymerizing the lignin comprises heating the phenolics liquid phase to a temperature of at least about 270° C. in the presence of molecular hydrogen and the slurry catalyst.

15. The method of claim 1, further comprising:
measuring the viscosity of the phenolics liquid phase while converting the phenolics liquid phase into the phenolic solvent.

16. The method of claim 1, wherein the alcoholic component is formed by a catalytic reduction reaction of soluble carbohydrates, the soluble carbohydrates being derived from the cellulosic biomass solids.

17. The method of claim 1, wherein the slurry catalyst comprises a poison-tolerant catalyst.

18. The method of claim 17, wherein the poison-tolerant catalyst comprises a sulfided catalyst.

* * * * *